No. 12,346. REISSUED MAY 16, 1905.

C. HARTER.

MACHINE FOR ROLLING CORRUGATED HEADERS FOR TUBULAR BOILERS.

APPLICATION FILED JULY 9, 1902.

2 SHEETS—SHEET 1.

Witnesses
Charles Hanimann
Samuel L. Surgent.

Charles Harter
Inventor

By Lie Attorney
Chas. H. Forbes

No. 12,346. REISSUED MAY 16, 1905.

C. HARTER.

MACHINE FOR ROLLING CORRUGATED HEADERS FOR TUBULAR BOILERS.

APPLICATION FILED JULY 9, 1902.

2 SHEETS—SHEET 2.

Witnesses
Charles Hanimann
Samuel L. Sargent

Charles Harter
Inventor

By his Attorney
Chas. M. Forbes

No. 12,346. Reissued May 16, 1905.

UNITED STATES PATENT OFFICE.

CHARLES HARTER, OF SOUTH PASADENA, CALIFORNIA, ASSIGNOR TO THE BABCOCK AND WILCOX COMPANY, OF NEW YORK, N. Y.

MACHINE FOR ROLLING CORRUGATED HEADERS FOR TUBULAR BOILERS.

SPECIFICATION forming part of Reissued Letters Patent No. 12,346, dated May 16, 1905.

Original No. 674,555, dated May 21, 1901. Application for reissue filed July 9, 1902. Serial No. 114,966.

*To all whom it may concern:*

Be it known that I, CHARLES HARTER, a citizen of the United States, residing at South Pasadena, in the county of Los Angeles and State of California, have invented a certain new and useful Improvement in Machines for Rolling Corrugated Headers for Tubular Boilers, of which the following is a specification.

My invention has relation to improvements in devices for corrugating the headers of that class of steam and heating boilers which consist of opposite-disposed vertical hollow cases termed "headers" united by parallel tubes. In many instances these headers are straight rectangular tubes; but a preferred form of construction is to corrugate them in sinuous lines, the opposite walls being similarly shaped, thus permitting the tubes to be inserted alternately in the projecting sinuosities to enable them to stand alternately in vertical planes.

To the accomplishment of the aforesaid purpose my invention consists in the combination, with rolls acting upon the exterior of opposite sides of the tube and formed to produce depressions therein, with a mandrel or support located within the tube and coöperating with the rolls.

Figure 1:
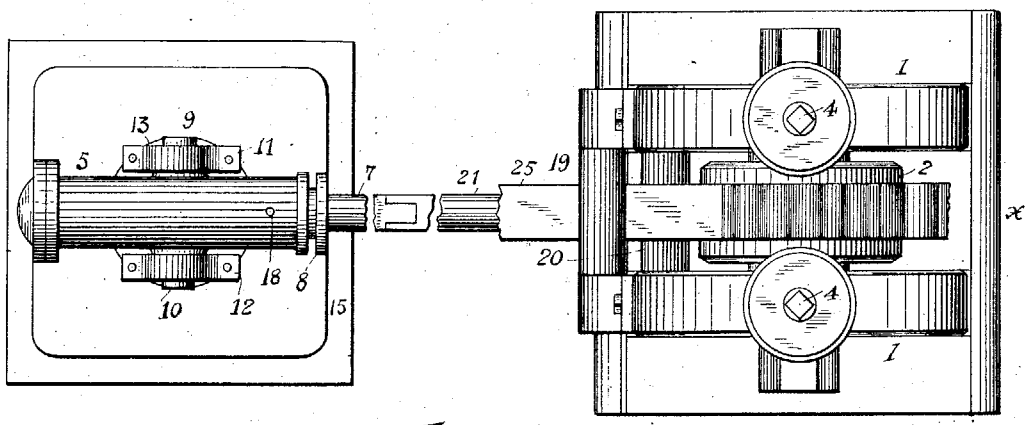
Figures 2, 3:
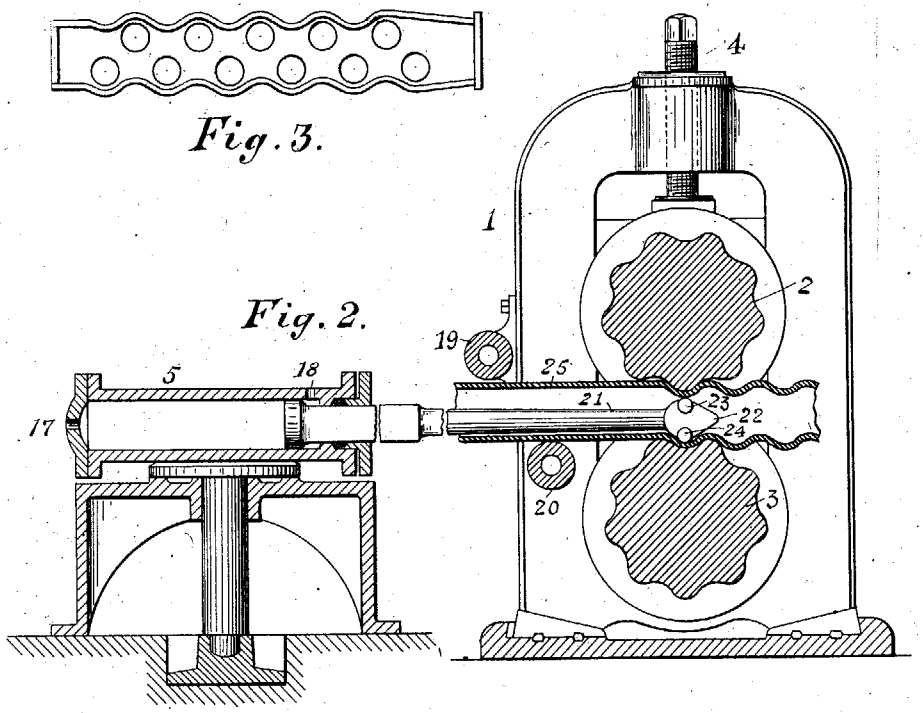

In the accompanying drawings, in which similar reference-numerals indicate like parts in the different views, Figure 1 is a plan of my improved device for corrugating the tubes; Fig. 2, a section at the line X X of Fig. 1; and Fig. 3, an end view of a boiler, illustrating the form of header which my device is designed to make.

Referring to the figures, 1 is a housing in which are revolubly mounted upper and lower oppositely-disposed rolls 2 3, having corrugated peripheries so adjusted that the ridges of one will in their revolution be opposite the intermediate channels of the other. These rolls are arranged to be brought into proper relation to each other by screws 4, meshing in screw-threaded openings in the housings 1. Opposite to the medial line between the rolls 2 3 is situated a hydraulic cylinder 5, in which is a piston 6, which has a piston-rod 7, that extends movably through a stuffing-box 8. This cylinder 5 bears on opposite sides trunnions 9 10, mounted in boxes 11 12 on a circular head 13 on a vertical shaft 14, revolubly mounted in a housing 15, the lower end of said shaft resting in a step 16. Ports 17 18 are provided in said cylinder for the entrance and exhaust of the fluid under pressure to actuate the piston 6; but as this is a common form of a hydraulic cylinder the pipes for connecting either with a source of fluid-supply are omitted.

Above and below the line of entrance to the rolls are arranged guide-rolls 19 20, supported in suitable bearings in the housings 1. The housings 15 and 1 are set or separated at such a distance apart that a tube of any determined length may be interposed between them, this fact being suggested by the broken lines which mark their limit in the figures. Attached to the projecting end of the piston-rod 7 is a mandrel 21, having a head 22 with a plain upper, lower, and back face of the width of the header to be corrugated and a narrow front edge for facility of entering the header and provided at its greatest vertical thickness with upper and lower friction-rollers 23 24. The vertical distance between the outer peripheries of the rollers 23 24 is such as will fill the space between the upper and lower internal faces of the header when between the rolls 2 3.

In operation a lap-welded square tube 25 to constitute the header is heated to such a degree as to render it malleable in a furnace (not shown) at one side of the circular head 13. The head 13 is then revolved on its shaft 14 enough to bring the head of the mandrel in alinement with the end of the heated tube, the piston 6 being during this portion of the operation drawn back to the left end of the cylinder. The mandrel 21 is then forced into the heated tube until its front projects from the farther end thereof, thus supporting the tube thereon. The head 13 is then revolved until the mandrel-head 22 is in position to pass between the guide-rolls 19 20. The rolls 2 3 being in motion, the piston 6 is then forced forward until the end of the tube 25 and the mandrel-head 22 rest between the rolls 2 3, which immediately draw the tube between them until it passes completely through and is stripped from the mandrel-head 22. In this process the tube 25 will be corrugated on its upper and lower faces by corresponding sinuous lines, as shown in Fig. 2, the mandrel-head 22 acting as an inner support therefor during the passing of the tube between the rolls, thus producing a header of the form shown in Fig. 3.

I claim as my invention—

1. In an apparatus for shaping wrought-metal headers or other tubular bodies of irregular outline longitudinally, the combination of rolls arranged to revolve adjacent to each other and having longitudinal corrugations on their faces, a mandrel adapted to support the inner faces of the tube between the rolls during the shaping process, and means independent of the means that move the article being corrugated for actuating said mandrel.

2. A machine for corrugating headers for tubular bodies consisting of oppositely-disposed rolls having corrugations on the faces thereof parallel with the axes of the rolls, arranged to revolve adjacent to each other with the grooves of said rolls alternating, and a mandrel having a head to support the inner faces of the header between the rolls during the process, substantially as shown and described.

3. A machine for corrugating headers for tubular boilers consisting of like oppositely-disposed rolls having corrugations on the faces thereof parallel with the axes of the rolls, arranged to revolve adjacent to each other with the grooves of said rolls alternating, and a mandrel having a head with frictional rollers to support the inner faces of the header between the rolls during the process, substantially as shown and described.

4. In a machine for corrugating headers for tubular boilers, the combination with oppositely-disposed rolls having corrugations on the faces thereof parallel with the axes of the rolls, arranged to revolve adjacent to each other with the grooves of said rolls alternating, of a hydraulic cylinder having a piston carrying a mandrel having a head to support the inner faces of the header between the rolls, and arranged to carry and hold said mandrel-head between the rolls and withdraw it therefrom, substantially as shown and described.

5. In a machine for corrugating headers for tubular boilers, the combination with oppositely-disposed rolls having corrugations on the faces thereof parallel with the axes of said rolls, arranged to revolve adjacent to each other with the grooves of said rolls alternating, of a hydraulic cylinder mounted on a support to revolve horizontally having a piston carrying a mandrel bearing a head to support the inner faces of the header between the rolls, and arranged to bring said mandrel-head in alinement with said rolls and carry and hold it between them and withdraw it therefrom, substantially as shown and described.

6. A machine for forming tubes into longitudinal serpentine shape comprising oppositely-disposed fluted rolls, arranged to revolve in relation to each other so that the interdental spaces of the rolls alternate, combined with a mandrel or support located between the rolls having a head to support the inner faces of the tube during the process.

7. In an apparatus for shaping wrought-metal headers or other tubular bodies of irregular outline longitudinally, the combination of rolls arranged to revolve adjacent to each other and having longitudinal corrugations on their faces, a mandrel adapted to support the tube on the inside between the rolls during the progressive shaping process, and pivotal supports for the mandrel, whereby the mandrel is free to accommodate itself to the position of the space between the corrugating-rolls, substantially as shown and described.

8. In an apparatus for shaping wrought-metal headers or other tubular bodies of irregular outline, the combination of rolls arranged to revolve adjacent to each other and having longitudinal corrugations on their faces, a mandrel arranged within the tube and constructed to support the inner faces thereof between the rolls only and during the shaping process, and means independent of the means that move the article being corrugated for actuating and holding the mandrel, substantially as shown and described.

9. In a machine for corrugating headers or other tubular bodies, the combination of oppositely-disposed rolls having corrugations on the faces thereof parallel with the axes of the rolls, arranged to revolve adjacent to each other with the grooves of the said rolls alternating, a mandrel to support the inner faces of the body being corrugated, and means for holding the mandrel between the rolls during the rolling process so as to prevent longitudinal movement thereof, substantially as shown and described.

CHARLES HARTER.

Witnesses:
EVERETT D. HILL,
MRS. EVERETT D. HILL.